United States Patent [19]

Yasuda et al.

[11] 4,199,470

[45] Apr. 22, 1980

[54] MATERIAL FOR RECOVERING URANIUM AND METHOD FOR RECOVERING A URANIUM SOLUTION OF HIGH PURITY AND HIGH CONCENTRATION, USING THE SAME

[75] Inventors: Shinichi Yasuda, Otsu; Takayasu Niwa, Toyonaka; Takayuki Kurohara, Osaka, all of Japan

[73] Assignee: Koei Chemical Co., Ltd., Osaka, Japan

[21] Appl. No.: 903,144

[22] Filed: May 5, 1978

[30] Foreign Application Priority Data

| May 13, 1977 | [JP] | Japan | 52/56071 |
| Aug. 29, 1977 | [JP] | Japan | 52/103419 |
| Feb. 2, 1978 | [JP] | Japan | 53/11322 |

[51] Int. Cl.$^2$ .................. B01D 59/30; C22B 60/02
[52] U.S. Cl. .................. 252/184; 252/426; 423/6; 423/7
[58] Field of Search .................. 252/184, 426, 430; 176/37; 423/6, 7

[56] References Cited

U.S. PATENT DOCUMENTS

| 2,563,587 | 8/1951 | DeMent | 252/184 |
| 4,118,457 | 10/1978 | Seko et al. | 423/7 |

FOREIGN PATENT DOCUMENTS

47-99407 10/1972 Japan.

OTHER PUBLICATIONS

Wolf et al., Frensenius Zeitschrift for Analytisehe Chemie, vol. 238, No, 6, pp. 423-441 (1968).

*Primary Examiner*—Benjamin R. Padgett
*Assistant Examiner*—Irwin Gluck
*Attorney, Agent, or Firm*—Stevens, Davis, Miller & Mosher

[57] ABSTRACT

Uranium is recovered from its solution through contact with a uranium-recovering material of higher resistance to water and higher mechanical strength comprising a weakly basic anion exchange resin having pyridine nuclei at its main chain or side chain, and a crossed-linked polymer structure with a high uranium selectivity at a high uranium-adsorbing speed.

21 Claims, No Drawings

MATERIAL FOR RECOVERING URANIUM AND METHOD FOR RECOVERING A URANIUM SOLUTION OF HIGH PURITY AND HIGH CONCENTRATION, USING THE SAME

The invention relates to a material for recovering uranium comprising a mineral acid salt of weakly basic anion exchange resin having pyridine nuclei at its main chain or side chain and a cross-linked polymer structure, and a method for recovering a uranium solution of high purity and a high concentration, using said material.

Recently, world demand for uranium has been increased year after year, and it is a trend to extract uranium from ores of very low concentration or sea water. On the other hand, uranium is a radioactive element, and thus it is necessary from a viewpoint of preventing the environmental pollution to reduce the uranium concentration of effluent water resulting from extraction recovery treatment substantially to zero.

Under these current circumstances, a material for recovering uranium must have such an excellent property as to recover uranium from a solution of very low concentration, and also must have a very high selectivity to uranium, since uranium usually exists together with other metal elements.

One of conventional process for recovering of uranium to obtain an uranium solution begins with leaching of uranium ores. The sulfuric acid-leach liquor contains many kinds of metals such as iron, manganese, cobalt, nickel, copper, vanadium, molybdenum, aluminum, thorium, calcium, sodium, potassium, etc., as ions, though their kinds and concentrations vary considerably due to their origins. Thus, it is necessary to selectively recover uranium from the liquor for the purpose of to obtain uranium of fission fuel grade.

According to one of the conventional processes for recovering uranium, a sulfuric acid-leach liquor is oxidized by an oxidizing agent such as manganese dioxide, etc. to hexavalent state, and then uranium is recovered from the liquor, using trialkylamines such as trioctylamine, or phosphoric acid esters as an extracting agent. However, the extracting agents are slightly soluble or emulsified in water, and carried off into the raffinate. These extracting agents are suitable for uranium recovery from such liquor, but the loss of the extracting agent into the raffinate is not to be neglected in a uranium recovery process in the view point of environmental pollution and recovery cost. In order to prevent the loss of the extracting agent, many additional facilities are required.

According to another process, a strongly basic anion exchange resin is employed in place of said extracting agents, where any contamination of raffinate with organic compounds does not occur, but all other anions than uranium ions are also adsorbed, and thus the purity of eluted uranium is inevitably lowered. Furthermore, silica is also adsorbed on the ion exchange resin, and the adsorbed silica cannot be eluted by a conventional uranium-eluting agent for the strongly basic anion exchange resin, such as sodium chloride or ammonium nitrate. Owing to the adsorbed silica, the ion exchange resin is gradually deteriorated.

The conventional processes thus have advantages as well as disadvantages, and require many additional steps. The present inventors have made an extensive study of a large number of uranium-recovering materials and have found a novel material for recovering uranium which can overcome said disadvantages, and have established the present invention.

An object of the present invention is to provide a material for recovering uranium, comprising a mineral acid salt of weakly basic anion exchange resin having pyridine nuclei at its main chain or side chain, and also having a cross-linked polymer structure.

Another object of the present invention is to recover uranium from acid leach liquor, in which uranium is present in the form of uranyl anions.

In the acid leach liquor, the following equation has been proposed.

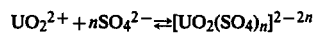

$$UO_2^{2+} + nSO_4^{2-} \rightleftharpoons [UO_2(SO_4)_n]^{2-2n}$$

Yet, another object of the present invention is to provide a method for recovering a uranium solution of high purity and high concentration, using said material for recovering uranium.

It is known that compounds having a pyridine nucleus can form coordination compounds with certain metal compounds or ions. However, the compounds having such pyridine nucleus, especially those with low molecular weight are soluble in water, and possess unpleasant odor. They require special facilities for their separation from the aqueous raffinate, and they may cause secondary environmental pollution.

In view of these problems, the present inventors endeavoured to synthesize polymeric compounds having pyridine nuclei at its main chain or side chain, and having property to coordinate a uranium compound, and succeeded in their synthesis. Such polymeric compounds can be prepared by copolymerizing a vinyl monomers having a pyridine nucleus and a monomer having at least two unconjugated ethylenic double bonds with or without another vinyl monomer. The vinyl monomers having a pyridine nucleus include, for example, 2-vinylpyridine, 3-vinylpyridine, 4-vinylpyridine, 2-methyl-4-vinylpyridine, 2-vinyl-5-methylpyridine, 2-methyl-5-vinylpyridine, 2-methyl-6-vinylpyridine, 3-methyl-4-vinylpyridine, etc.

The monomers having at least two unconjugated ethylenic double bonds include, for example, divinylbenzene, divinylphthalate, ethyleneglycol diacrylate, etc.

Other vinyl monomers other than those having a pyridine nucleus, which may or may not employed in the copolymerization, include, for example, styrene, vinyltoluene, acrylonitrile, etc.

In the course of the study, the present inventors have found that the cross-linked structure in such polymeric compounds which is due to the monomer having at least two conjugated ethylenic double bonds is very important for the purpose of the present invention. That is, uranium-adsorbing speed of the polymeric compound can be increased and a uranium-adsorbing selectivity can be improved by providing the polymeric compound with a cross-linked structure, and also water resistance and mechanical strength of the polymeric compound can be increased which are very important properties in the industrial application.

The crosslinkage of anion exchange resin in the present invention is in the range of 4 to 30 percent by weight, preferably 6 to 15 percent by weight.

Above mentioned crosslinkage was calculated on the basis of the following equation.

$$\text{Crosslinkage (\%)} = \frac{\begin{bmatrix}\text{Weight of monomer having at}\\ \text{least two unconjugated}\\ \text{ethylenic double bonds}\end{bmatrix}}{[\text{Total weight of all monomer}]} \times 100$$

In the present invention, the material for recovering uranium can be prepared by first synthesizing according to the well-known method, for example, by radical or ionic copolymerization, followed by treating with a mineral acid to form a salt.

The present inventors have found that the weakly basic anion exchange resin can be swollen 130 to 190% by treating with a mineral acid to form the salt thereof and can be remarkably increase the adsorbability of uranium.

The present material for recovering uranium may have either a gel structure or a porous structure, but the larger surface area is more desirable for achieving the purpose of the present invention.

The material having a porous structure can be prepared by copolymerization of the monomers in the presence of a precipitating agent, and any precipitating agent can be used, so long as it dissolves the monomers, but does not dissolve the polymer and does not take part in the copolymerization. Examples of the precipitating agents include alcohols having at least 4 carbon atoms, such as butanol, sec.-butanol and 2-ethylhexanol, saturated aliphatic hydrocarbons having at least 5 carbon atoms such as heptane and isooctane, aramatic hydrocarbons having at least 6 carbon atoms such as benzene, toluene and ethylbenzene, saturated alicyclic hydrocarbons having at least 6 carbon atoms such as cyclohexane, organic esters having at least 6 carbon atoms such as dibutylphthalate, dioctylphthalate, and dibutyl adipate, drying oil disclosed in Japanese Patent Publication No. 888/72, and solubilizing agents being capable of forming inert micells and being soluble in monomer but insoluble in copolymer disclosed in Japanese Patent Publication No. 40315/72. It is desirable to use 5 to 60 parts by weight of the precipitating agent per 100 parts by weight of the monomers.

The ion exchange resin of the present invention thus prepared is a mineral acid salt of weakly basic anion exchange resin having pyridine nuclei at its main chain or side chain and a cross-linked polymer structure, and a powdery or granular appearance.

The weakly basic anion exchange resin of the present invention has the following physical properties:
  Compression strength: 500–1,000 grams/bead
  Overall exchange capacity: 4.0 equivalents/liter
  Water content: 35–40%

The weakly basic anion exchange resin of the present invention can be of course used alone, but can be used together with an appropriate carrier, if necessary. For example, the resin can be shaped into an appropriate form together with a carrier material such as activated carbon, silica gel, activated alumina, zeolite, graphite, etc.

The ion exchange capacity per unit/volume of the material for recovering uranium of the present invention depends considerably upon the kind of an acid employed to form a salt of the weakly basic anion exchange resin, and thus the selection of an acid is important.

The weakly basic anion exchange resin of the present invention has a much larger ion exchange capacity than that of the conventional anion exchange resin, and thus can be used in a smaller amount with a less equipment cost. Furthermore, the present resin has a large compression strength and a larger resistance to acids, and thus has a longer life in the uranium recovery usually carried out under acidic conditions than conventional ion exchange resins.

Still furthermore, the present resin has a higher uranium-adsorbing speed and a higher uranium adsorbability with much less leakage of uranium, and thus requires no additional facilities for treating a waste effluent.

The present resin has a much higher adsorption selectivity to uranium, independently of a uranium concentration of the liquor, and thus uranium can be obtained substantially free from the coexisting impurities such as Fe, Cu, Co, Ni, Mn, Al, Th, Ca, Na, K, etc. Therefore, the uranium recovered by the material of the present invention is suitable for the production of uranium hexafluoride.

A uranium solution of high concentration can be obtained by repeatedly using an eluted effluent containing uranium as an eluting agent. Thus, by the method of the present invention, it is possible to obtain uranium solution having several times higher concentration than a solution obtained by the conventional method. That is, a less amount of the eluting solution can be used, and an extraction loss can be reduced in the case of further amine extraction of uranium by a wet process, and as a result the necessary facilities can be made more compact.

As the eluting agent, an aqueous solution of an inorganic acid such as sulfuric acid, hydrochloric acid, nitric acid, etc., or an aqueous solution of an alkali salt such as sodium carbonate and potassium carbonate, sodium chloride and ammonium nitrate or an acidified salt solution such as a sulfuric acid-acidified aqueous sodium chloride solution and a sulfuric acid-acidified aqueous ammonium sulfate can be employed. Various contaminant metals found in the uranium ores are dissolved in the acid leach liquor, and most of them are present in the form of cations. They are caught in the ion exchange resin of present invention during they pass through the resin presumablly forming some chemical bonding with the resin. Therefore they can not be removed from the resin by ordinary method of washing with water. They are, however, eluted by acidic eluting agents, and thus lower the purity of the recovered uranium. On the other hand, it was found that the elution of the adsorbed uranium with an eluting agent from the resin of present invention does not take place at once, but requires some period of time, and this is one of the outstanding features of the resin of present invention. These findings leads a method for recovering uranium of high purity, that is to wash the uranium adsorbed resin with a small amount of eluting agent before the elution, and put aside the effluent during the washing period. By this way, most of the metal cations caught in the resin and only miner amounts of uranium are eluted during the washing operation. It is not necessary to use the same compound as the washing material and as the eluting agent. When concentrated hydrochloric acid is employed as the washing agent, water can be employed as an eluting agent, for the uranyl anion caught in the resin which is changed into tetrachlorouranyl anion $[UO_2Cl_4{}^{2-}]$.

Concentration of the aqueous solution of inorganic acid as the eluting agent is 0.5 to 10 N (normality), preferably 1 to 6 N.

Uranium is adsorbed onto the uranium-recovering material usually by a fixed bed process, passing a uranium-containing solution through a fixed bed of the present material for recovering uranium. It is also possible to operate by a moving bed process.

The uranium-containing solution, from which uranium is recovered by the use of the material of the present invention and by the method of the present invention, is uranium solution containing a sulfuric acid, in which uranium is present in the form of uranyl anion. Even though the concentration of uranium is not more than 10 ppm by weight recovery of uranium can be successively achieved by the present method.

The elution of uranium from the uranium-adsorbed material of the present invention by the eluting agent can be carried out even at the ordinary temperature, but preferably at a temperature below 100° C., more preferably 30° to 80° C.

The repeated use of the eluting effluent containing uranium as the eluted agent have been proven by the inventors of the present invention.

Since the elution consumes some amounts of eluting agent, it is desirable to add eluting agent to the eluted effluent before the repeated use. Repetition use of the eluting agent may be done even 5 times or more, and it is possible to recover uranium solution having concentration several times higher than that of obtained from the conventional process.

The resulting eluted effluent of high concentration and high purity can be converted into yellow cakes only by adding an alkali such as ammonia.

Now, the present invention will be described in detail below, referring to Examples.

EXAMPLE 1

40 Parts by weight of 4-vinylpyridine purified from a commercially available product by simple distillation under a reduced pressure and 4 parts by weight of commercially available divinylbenzene were dispersed in 300 parts by volume of an aqueous 15% sodium formate solution, using a hydroxyethyl cellulosic stabilizer as a dispersion stabilizer, and subjected to reaction at 80° C. for 5 hours, using benzoyl peroxide as a polymerization initiator. After the reaction was completed, the reaction product was filtered, treated with sulfuric acid and washed with water, whereby about 46 parts by weight of sulfuric acid salt of cross-linked polymers in a spherical form were obtained.

10 Parts by volume of the resulting polymers in the spherical form were filled in a chromatographic glass tube, and a sulfuric acid-acidified aqueous uranium solution having a uranium concentration of 500 ppm was passed therethrough from its bottom at a flow rate of 50 parts by volume/hr. After 40 hours, 50 parts by volume of the effluent was sampled and subjected to uranium analysis according to the hydrogen peroxide method, whereby it was found that the uranium concentration was 2 ppm. The amount of uranium adsorbed was 99%.

EXAMPLE 2

A mixture of 130 parts by weight of commercially available 4-vinylpyridine, 87 parts by weight of commercially available divinylbenzene, 38 parts by weight of isooctane, and 3.3 parts by weight of benzoyl peroxide was dispersed in a mixture of 510 parts by weight of water, 100 parts by weight of sodium chloride, 1.9 parts by weight of sodium nitrite, and 2.8 parts by weight of hydroxyethyl cellulose. The resulting mixture was gradually heated to 80° C. over a period of one hour, and kept at that temperature for 7 hours. After the reaction was completed, polymers in a spherical form were obtained by filtration, and washed with methanol in Soxhlet extraction, treated with sulfuric acid and washed with water, whereby 550 parts by volume of white opaque spherical porous sulfuric acid salt of resin were obtained.

300 Parts by volume of said resins were filled in a glass tube, and an aqueous sulfuric acid solution containing 500 ppm of uranium was passed therethrough from its top at a flow rate of 1,500 parts by volume/hr.

After 15 hours, 50 parts by volume of the effluent was sampled and subjected to uranium analysis according to the hydrogen peroxide procedure, whereby it was found that the uranium concentration was less than 1 ppm and uranium in the influent solution was substantially adsorbed on the resins.

EXAMPLE 3

150 Parts by weight of commercially available 4-vinylpyridine, 50 parts by weight of commercially available 2-vinylpyridine and 50 parts by weight of commercially available divinylbenzene were suspended in 1,000 parts by volume of an aqueous 20% sodium chloride solution, using a hydroxyethyl cellulose as a dispersion stabilizer, and subjected to reaction at 80° C. for 8 hours, using benzoyl peroxide as a polymerization initiator. After the reaction was completed, the resulting polymers in a spherical form were washed with methanol in Soxhlet extraction, treated with sulfuric acid and washed with water whereby 400 parts by volume of the sulfuric acid salt of polymers in a spherical form were obtained.

300 Parts by volume of the polymers in a spherical form were filled in a glass tube, and an acid leach liquor (uranium concentration: 500 ppm) was passed therethrough from its bottom at a flow rate of 1,500 parts by volume/hr.

After 24 hours, 50 parts by volume of the effluent was sampled, and subjected to uranium analysis according to the hydrogen peroxide method, where it was found that the uranium concentration was 5 ppm. The amount of uranium adsorbed was 99% of uranium present in the influent.

EXAMPLE 4

A mixture of 200 parts by weight of commercially available 4-vinylpyridine, 136 parts by weight of commercially available divinylbenzene, 59 parts by weight of isooctane, 2 parts by weight of benzoyl peroxide, and 3.4 parts by weight of lauryl peroxide was dispersed in a mixture of 800 parts by weight of water, 234 parts by weight of sodium chloride, 2.9 parts by weight of sodium nitrite and 4.25 parts by weight of hydroxyethylcellulose. The resulting mixture was gradually heated and subjected to reaction at 80° C. for 8 hours. After the reaction, the resulting polymers in a spherical form were washed with methanol in Soxhlet extraction, whereby 690 parts by volume of white opaque spherical of porous resin were obtained. The resin was treated with sulfuric acid aqueous solution and washed with water.

50 Parts by volume of the sulfuric acid salt of resin was admixed with 100 parts by volume of an aqueous solution containing 20 ppm of uranium, and stirred for 3 hours, and the solution was subjected to uranium analysis, whereby it was found that the uranium concentration of the solution was below 1 ppm and uranium was substantially adsorbed.

EXAMPLE 5

50 Parts by volume of the resin beads as obtained in Example 4 were admixed with 300 parts by volume of raffinate of the uranium extraction containing 20 ppm of uranium, and stirred for 8 hours according to a batch process, and the effluent was subjected to uranium analysis, whereby it was found that the uranium concentration of the effluent was reduced to less than 1 ppm and more than 95% of uranium was adsorbed.

EXAMPLE 6

200 Parts by volume of the beads of the porous resin prepared in Example 2 were filled in a glass tube having an inner diameter of 23 mm, and an aqueous sulfuric acid solution containing 272 ppm of uranium was passed therethrough from its top at a flow rate of 1,000 parts by volume/hr. It was found that the amount of uranium adsorbed until 10 ppm of uranium started to leak was 7.6 parts by weight, and a break through exchange capacity of the resin was 38 parts by weight of uranium/$10^3$ parts by volume of resin.

COMPARATIVE EXAMPLE 1

Test was conducted in the same manner as in Example 6 except that commercially available quaternary amine type ion exchange resin, Diaion SA-10A (trademark of a product made by Mitsubishi Kasei Kogyo K.K., Japan) was employed in place of the resin beads of Example 6. The amount of uranium adsorbed until 10 ppm of uranium started to leak was 3.8 parts by weight, and a break through exchange capacity was 18 parts by weight of uranium/$10^3$ parts by volume of resin.

EXAMPLE 7

30 Parts by volume of the porous resin prepared in Example 2 were placed in 5,000 parts by volume of an aqueous sulfuric acid solution containing 30 ppm of uranium and after stirring for 3 hours. Uranium concentration of the filtrate was measured, whereby it was found that the uranium concentration was 10 ppm, 1.55 parts by weight of uranium was adsorbed.

COMPARATIVE EXAMPLE 2

Tests were conducted in the same manner as in Example 7, except that commercially available tertiary amine type ion exchange resins, Amberlite IRA-93 (trademark of a product made by Rohm and Haas, Co., USA) and Diaion WA-30 (trademark of a product made by Mitsubishi Kasei Kogyo K.K., Japan) were employed in place of the beads of porous resin of Example 7. It was found that the amounts of uranium adsorbed on Amberlite IRA-93 and Diaion WA-30 were 0.75 part by weight and 0.78 part by weight, respectively.

EXAMPLE 8

200 Parts by volume of the weakly basic anion exchange resin as prepared in Example 1 was filled in an ion exchange resin column, and $80 \times 10^3$ parts by volume of an aqueous uranyl sulfate solution containing 100 ppm of uranium was passed therethrough. Concentrated 35% hydrochloric acid was passed through the ion exchange resin having thus adsorbed uranium, and then 2,000 parts by volume of water as an eluting agent was passed therethrough. It was found that the eluted effluent contained 3,800 ppm of uranium.

The resulting eluted effluent was further passed as an eluting agent through another uranium-adsorbed resin after passage of concentrated 35% hydrochloric acid therethrough. It was found that the eluted effluent from the latter resin contained 7,700 ppm of uranium.

EXAMPLE 9

An oil phase and a water phase shown in the following Table 1 were charged into a $2 \times 10^3$ parts by volume separable flask with a reflux condenser and a stirrer, and the oil phase was dispersed into the water phase at 150 rpm. Then, the inside temperature of the flask was elevated to 70° C. over a period of one hour to complete copolymerization. After the end of copolymerization, the inside temperature of the flask was elevated to 90° C., and the mixture in the flask was stirred for 4 hours, cooled and filtered. The resulting spherical form of polymer were washed with methanol in Soxhlet extraction, whereby an anion exchange resin of vinylpyridine-divinylbenzene copolymer was obtained.

400 Parts by volume of the resin was washed with an aqueous 2 N sulfuric acid, to form the sulfuric acid salts of the resins and then filled in two ion exchange resin columns of fixed bed type having an inner diameter of 2 cm each in equal amounts, and $52 \times 10^3$ parts by volume of an aqueous uranyl sulphate solution having pH 1 (a solution being acid leach liquor and containing 480 ppm of uranium, 4,100 ppm of iron, 1.3 ppm of molybdenum, 7.4 ppm of nickel, 4.8 ppm of copper and 128 ppm of manganese) was passed through the ion exchange columns communicated with each other in series at a space velocity of 10 $hr^{-1}$. When $52 \times 10^3$ parts by volume of the aqueous uranyl sulfate solution was completely passed therethrough, a uranium concentration of an effluent from the first ion exchange column was 250 ppm and that of the effluent from the second ion exchange column was 0.5 ppm.

After the passage of the aqueous uranyl sulfate solution was stopped and the first ion exchange resin column was washed with water, 1000 parts by volume of an aqueous 2 N sulfuric acid was passed therethrough the first ion exchange resin column at a space velocity of 1 $hr^{-1}$. The effluent aqueous sulfuric acid solution contained 1,200 ppm of iron, 0.2 ppm of manganese, 0.2 ppm of nickel and 0.4 ppm of molybdenum, whereas no uranium was contained herein at all.

Then, the first ion exchange resin column was washed with water, and 3,500 parts by volume of an aqueous 4 N sulfuric acid solution at 55° C. was passed therethrough as a uranium-eluting agent at a space velocity of 1 $hr^{-1}$. The eluted effluent contained 6,600 ppm of uranium, 4 ppm of iron, and 0.3 ppm of molybdenum, whereas copper, manganese and nickel were not detected therein at all.

Table 1

| Oil phase | | Water phase | |
|---|---|---|---|
| 4-Vinylpyridine | 257 parts by weight | Water | 800 parts by weight |
| Divinylbenzene | 62 parts by weight | Sodium chloride | 234 parts by weight |
| Benzoyl peroxide | 3 parts by weight | Hydroxyethyl-cellulose | 4 parts by weight |

COMPARATIVE EXAMPLE 3

400 Parts by volume of the anion exchange resin of vinylpyridine-divinylbenzene copolymer as obtained in the same manner as in Example 9 was washed with an aqueous 2 N sulfuric acid solution, and then filled in two ion exchange resin column having an inner diameter of 2 cm each in equal amounts.

$52 \times 10^3$ parts by volume of the aqueous uranyl sulfate solution as in Example 9 was passed through the ion exchange resin columns communicated with each other in series at a space velocity of 10 hr$^{-1}$.

When $52 \times 10^3$ parts by volume of the aqueous uranyl sulfate solution was completely passed through the columns, a uranium concentration of the effluent solution from the first ion exchange resin column was 240 ppm, and that of the effluent solution from the second ion exchange column was 0.4 ppm.

After the passage of the aqueous uranyl sulfate solution was stopped, and the first ion exchange resin column was washed with water, 3,500 parts by volume of an aqueous 4 N sulfuric acid solution at 55° C. was passed therethrough as a uranium-eluting agent at a space velocity of 1 hr$^{-1}$. It was found that the effluent contained 7,600 ppm of uranium, 126 ppm of iron, 0.8 ppm of molybdenum, 0.5 ppm of nickel, 0.2 ppm of copper and 0.2 ppm of manganese.

EXAMPLE 10

Anion exchange resin of 4-vinylpyridine-2-vinylpyridine-divinylbenzene copolymer was prepared from an oil phase and a water phase of the composition shown in Table 2 in the same manner as in Example 9.

200 Parts by volume of the resin was washed with an aqueous 1 N sulfuric acid solution, to obtain sulfuric acid salts of the resin and filled in an ion exchange resin column of fixed bed having an inner diameter of 2 cm.

100 Parts by volume of an aqueous uranyl sulfate solution prepared by diluting the aqueous uranyl sulfate solution as in Example 9 with a 4-fold weight of water was passed through the ion exchange resin column at a space velocity of 10 hr$^{-1}$. When $100 \times 10^3$ parts by volume of the aqueous uranyl sulfate solution was completely passed therethrough, a uranium concentration of the effluent solution from the ion exchange resin column was 0.8 ppm.

After the ion exchange resin column was washed with water, 2,000 parts by volume of concentrated 35% hydrochloric acid was passed therethrough at a space velocity of 5 hr$^{-1}$. The effluent concentrated hydrochloric acid from the ion exchange resin column contained 550 ppm of iron, 0.2 ppm of manganese, 0.2 ppm of nickel, 0.2 ppm of molybdenum, and 100 ppm of uranium.

Then, 2,000 parts by volume of water was passed through the ion exchange resin column at a space velocity of 1 hr$^{-1}$. The effluent water from the ion exchange resin column contained 4,500 ppm of uranium and 8 ppm of iron, whereas manganese, nickel, molybdenum and copper were not detected therein at all.

Table 2

| Oil phase | | Water phase | |
|---|---|---|---|
| 4-Vinylpyridine | 207 parts by weight | Water | 800 parts by weight |
| 2-Vinylpyridine | 50 parts by weight | Sodium chloride | 234 parts by weight |
| Benzoyl peroxide | 3 parts by weight | Hydroxyethylcellulose | 4 parts by weight |
| Dioctyl phthalate | 50 parts by weight | | |

COMPARATIVE EXAMPLE 4

200 Parts by volume of the anion exchange resin as prepared in Example 10 was filled in an ion exchange resin column of fixed bed type having an inner diameter of 2 cm in the same manner as in Example 10, and $24 \times 10^3$ parts by volume of the same aqueous uranyl sulfate solution as in Example 2 was passed therethrough at a space velocity of 10 hr$^{-1}$.

Then, the ion exchange resin column was washed with water, and the ion exchange resin was taken out of the column, admixed with 2,000 parts by volume of an aqueous 2 N hydrochloric acid solution, stirred for two hours, and filtered. The resulting filtrate contained 1,100 ppm of uranium, 180 ppm of iron, 15 ppm of molybdenum, 0.4 ppm of nickel, 0.5 ppm of manganese, and 0.4 ppm of copper.

EXAMPLE 11

A mixed solution of 200 parts by weight of 4-vinylpyridine, 50 parts by weight of divinylbenzene, 50 parts by weight of dibutyl phthalate and 4 parts by weight of benzoyl peroxide was placed in a $1 \times 10^3$ parts by volume 4-necked flask with a reflux condenser, and left standing at 50° C. for 5 hours. Then, the inside temperature of the flask was elevated to 80° C. and kept at that temperature for 24 hours. Then, the 4-necked flask was splitted to obtain a solid polymerization product. The solid polymerization product was disintegrated to sizes of 10 to 50 mesh, and 200 parts by volume thereof was washed with an aqueous 1 N sulfuric acid solution, and then filled in an ion exchange resin column of fixed bed type having an inner diameter of 2 cm.

24 Parts by volume of the same aqueous uranyl sulfate solution as in Example 9 was passed through the resin column at a space velocity of 20 hr$^{-1}$, and it was found that the uranium concentration of the effluent solution from the resin column was 0.9 ppm.

Then, 2,000 parts by volume of concentrated 30% hydrochloric acid was passed through the ion exchange resin column at a space velocity of 10 hr$^{-1}$, and the effluent hydrochloric acid solution from the resin column contained 500 ppm of iron, 1.2 ppm of manganese, 0.9 ppm of nickel, 0.4 ppm of molybdenum, and 220 ppm of uranium. Then, 2,000 parts by volume of water was passed through the resin column at a space velocity of 2 hr$^{-1}$, and it was found that the effluent water from the resin column contained 5,400 ppm of uranium and 6 ppm of iron, whereas manganese, nickel, copper and molybdenum were not detected therein at all.

EXAMPLE 12

Anion exchange resin of 4-vinylpyridine-2-vinylpyridine-divnylbenzene copolymer was prepared from an oil phase and a water phase of the compositions shown in Table 2 in Example 10, except that 50 parts by of weight of dibutyl phthalate and 5 parts by weight of isooctane were used in place of 50 parts by weight of diooctyl phthalate, in the same manner as in Example 10. The similar results were obtained.

What is claimed is:

1. A material for recovering uranium from acidic uranium solution, which comprises a mineral acid salt of a weakly basic anion exchange resin having pyridine nuclei at its main chain or side chain, and a cross-linked polymer structure.

2. A material for recovering uranium from acidic uranium solution according to claim 1, wherein the weakly basic anion exchange resin is a cross-linked copolymer prepared from at least one vinyl monomer having a pyridine nucleus and a monomer having at least two unconjugated ethylenic double bonds.

3. A material for recovering uranium from acidic uranium solution according to claim 2, wherein the vinyl monomer having a pyridine nucleus is one member selected from the group consisting of 2-vinylpyridine, 3-vinylpyridine, 4-vinylpyridine, 2-methyl-4-vinylpyridine, 2-vinyl-5-methylpyridine, 2-methyl-5-vinylpyridine, 2-methyl-6-vinylpyridine and 3-methyl-4-vinylpyridine.

4. A material for recovering uranium from acidic uranium solution according to claim 2, wherein the monomer having at least two unconjugated ethylenic double bonds is one member selected from the group consisting of divinylbenzene and ethyleneglycol diacrylate.

5. A material for recovering uranium from acidic uranium solution according to claim 1, wherein the weakly basic anion exchange resin is a cross linked polymer prepared from at least one vinyl monomer having a pyridine nucleus and a monomer having an ethylenic double bond and a monomer having at least two unconjugated ethylenic double bonds.

6. A material for recovering uranium from acidic uranium solution according to claim 5, wherein the monomer having an ethylenic double bond is one member selected from the group consisting of styrene, vinyl toluene and acrylonitrile.

7. A material for recovering uranium from acidic uranium solution according to claim 1, wherein the mineral acid is one member selected from the group consisting of sulfuric acid and nitric acid.

8. A material for recovering uranium from acidic uranium solution according to claim 1, wherein the mineral acid salt of weakly basic anion exchange resin is sulfuric acid salt of copolymer of 4-vinylpyridine and divinylbenzene.

9. A material for recovering uranium from acidic uranium solution according to claim 1, wherein the weakly basic anion exchange resin has prous structure.

10. A material for recovering uranium from acidic uranium solution according to claim 8, wherein the sulfuric acid salt of copolymer of 4-vinylpyridine and divinylbenzene has porous structure.

11. A material for recovering uranium from acidic uranium solution according to claim 1, wherein the weakly basic anion exchange resin has gel structure.

12. A material for recovering uranium from acidic uranium solution according to claim 8, wherein the sulfuric acid salt of copolymer of 4-vinylpyridine and divinylbenzene has gel structure.

13. A material for recovering uranium from acidic uranium solution according to claim 1, wherein the weakly basic anion exchange resin is prepared by copolymerizing a vinyl monomer having a pyridine nucleus and a monomer having at least two unconjugated ethylenic double bonds in the presence of an organic acid ester as a precipitating agent.

14. A material for recovering uranium from acidic uranium solution according to claim 13, wherein the organic acid ester is one member selected from the group consisting of dioctylphthalate and dibutyl phthalate.

15. A material for recovering uranium from acidic uranium solution according to claim 1, wherein the weakly basic anion exchange resin has crosslinking bonds in the range of from 6 to 15 percent by weight.

16. A method for recovering uranium in the form of an aqueous uranium solution of high purity and high concentration which comprises eluting uranium from a uranium-adsorbed material with an eluting agent, characterized by using a material for recovering uranium from acidic uranium solution comprising a mineral acid salt of a weakly basic anion exchange resin having pyridine nuclei at its main chain or side chain, and a cross-linked polymer structure.

17. A method according to claim 16, wherein the eluting agent is an aqueous solution one member selected from the group consisting of sulfuric acid, hydrochloric acid, nitric acid, sodium carbonate, potassium carbonate, sulfuric acid-acidified ammonium sulfate, sulfuric acid-acidified sodium chloride and water.

18. A method according to claim 16, wherein an effluent containing uranium eluted from the uranium-adsorbed material is repeatedly used as the eluting agent.

19. A method according to claim 16, wherein the elution is carried out at a temperature between 30° to 80° C.

20. A method according to claim 16, wherein the uranium-adsorbed material is washed with a small amount of a mineral acid solution before the elution, and then uranium is eluted with an eluting agent.

21. A method according to claim 20, wherein the mineral acid is concentrated hydrochloric acid and the eluting agent is water or the diluted sulfuric acid.

* * * * *